United States Patent [19]
Naruse

[11] Patent Number: 6,088,409
[45] Date of Patent: Jul. 11, 2000

[54] RECEIVING APPARATUS FOR REDUCING POWER CONSUMPTION WHEN THE RECEIVED SIGNAL IS INTERMITTENTLY RECEIVED

[75] Inventor: Tetsuya Naruse, Chiba, Japan

[73] Assignee: Sony Corporation, Tokyo, Japan

[21] Appl. No.: 08/833,971

[22] Filed: Apr. 11, 1997

[30] Foreign Application Priority Data

Apr. 16, 1996 [JP] Japan .................................. 8-118536

[51] Int. Cl.[7] .................................................. H04L 7/00
[52] U.S. Cl. .................... 375/354; 375/364; 370/335; 370/342; 455/192.1; 455/265
[58] Field of Search ..................... 455/192.1, 192.2, 455/255, 257, 264, 265; 713/300, 320; 375/206, 354, 357, 367, 362, 200; 370/335, 342

[56] References Cited

U.S. PATENT DOCUMENTS

| | | | |
|---|---|---|---|
| 4,479,125 | 10/1984 | Mori | 340/825.44 |
| 5,142,699 | 8/1992 | Sato et al. | 455/343 |
| 5,299,228 | 3/1994 | Hall | 375/1 |
| 5,471,655 | 11/1995 | Kivari | 455/127 |
| 5,848,282 | 12/1998 | Kang | 395/750.05 |

*Primary Examiner*—Stephen Chin
*Assistant Examiner*—Dac V. Ha
*Attorney, Agent, or Firm*—Jay H. Maioli

[57] ABSTRACT

In a receiving apparatus intermittently receiving modulated and transmitted information, a controller controls a supply of source voltage to a synchronization correcting signal generator and a PN code generator for accurately demodulating the intermittently received modulated information and to an information demodulator and an information decoder to be carried out at a timing independent of each other, by which the information demodulator and the information decoder can be driven once while the synchronization correcting signal generator and the PN code generator are driven N times in synchronizm with a timing for driving the synchronization correcting signal generator and the PN code generator.

9 Claims, 2 Drawing Sheets

RECEIVING APPARATUS FOR REDUCING POWER CONSUMPTION WHEN THE RECEIVED SIGNAL IS INTERMITTENTLY RECEIVED

BACKGROUND OF THE INVENTION

This invention relates to a receiving apparatus and a receiving method used for, for example, portable telephones, and a communication system formed using the portable telephones.

In a portable telephone of a communication system using the spread spectrum transmission, while the portable telephone is in a so-called waiting status during which the telephone is detecting an incoming call the control signal transmitted from the base station is received and is correctly synchronized with a demodulating signal in the telephone so as to be demodulated.

This synchronization correction denotes a processing for synchronizing the generation timing of each PN code (pseudo random noise code) generated in the portable telephone with the generation timing of each PN code used for spread-modulation of the transmitted control signal in order to correctly demodulate the control signal which is spread-modulated by using the PN code.

In this case, the portable telephone detects a deviation between frequencies of both PN codes using the PN code generated according to the clock signal from the variable frequency oscillator of the telephone and the received control signal. According to the detected deviation between those frequencies, the oscillating frequency of the variable frequency oscillator of the telephone is corrected so that the generation timing of the PN code generated in the telephone can be synchronized properly with the generation timing of the PN code used for spread-modulation of the received control signal.

After this, the PN code generated in the telephone and corrected as described above is used to demodulate the received control signal into its original form before spread-modulation. The demodulated control signal is then used to get transmitted information and decide whether or not there is any call coming in to the telephone.

However, in such a portable telephone of a communication system to which the spread spectrum transmission is applied as described above, when the telephone is in the waiting status, an intermittent receiving processing is usually executed as shown in FIG. 1. This is because the telephone in the waiting status is only expected to detect call properly, so that there is no need to execute a receiving processing continuously.

Power consumption of such a portable telephone in the waiting status can thus be saved by executing a receiving processing in each receiving period TA and by executing no receiving processing in each non-receiving period TNA as shown in FIG. 1.

In such a portable telephone, each receiving cycle TS shown in FIG. 1 should preferably be set longer for consumption power saving. In other words, if the non-receiving period TNA is set longer while the number of receiving processings is reduced, the power consumption can be reduced.

In such a portable telephone, however, the accuracy of the receiving cycle TS depends on the accuracy of the variable frequency oscillator that decides the PN code generation timing. If the non-receiving period TNA is set longer while the variable frequency oscillator accuracy is not so high, then the synchronization between the above timings will be lost in a non-receiving period TNA and this will make it impossible to get the control signal in the next intermittent receiving processing period.

One of the measures for setting each non-receiving period longer is to use a high precision frequency oscillator. However, such a high precision frequency oscillator is expensive and rises the price of the portable telephone.

Accordingly, an ordinary portable telephone has used a low-price oscillator to avoid an incease of the price. The receiving cycle TS had thus to be set short. And, such a portable telephone requires frequent battery replacement or battery charging, which sometimes makes the telephone very inconvenient.

Under such circumstances, the object of this invention is to provide a receiving apparatus and a receiving method that can keep a proper synchronization accuracy and reduce power consumption while the telephone is waiting for a call without increasing the price of the portable telephone.

SUMMARY OF THE INVENTION

In order to solve the above problems and accomplish the above object, this invention provides a receiving apparatus intermittently receiving a modulated and transmitted signal w and demodulating a received signal, comprising:

a synchronization correcting circuit for correcting a frequency of a reference signal by using the received signal for making the reference signal in synchronization with the received signal and generating a demodulation signal for demodulating the received signal according to the reference signal;

a demodulating circuit for demodulating the received signal to be supplied as a demodulated signal by using the demodulation signal;

a decoding circuit for decoding the demodulated signal; and a controlling circuit for controlling the synchronization correcting circuit, and the demodulating circuit and the decoding circuit so that the synchronization correcting circuit is driven at a driving timing different from a driving timing for driving the demodulating circuit and the decoding circuit when the received signal is intermittently received, wherein the controlling circuit controls the demodulating circuit and the decoding circuit to be driven synchronously with the driving timing for the synchronization correcting circuit at a cycle N times (N is an integer of at least 2) that of said driving timing for driving the demodulating circuit and the decoding circuit.

In the receiving apparatus of this invention, the controller performs a control by which the synchronization correcting signal generator is driven independently of the demodulator and the decoder. The demodulator and the decoder are driven once synchronously with the correcting signal generator while the correcting signal generator is driven N times.

DETAILED DESCRIPTION OF THE PREFERRED EMBODIMENTS

Hereunder, an embodiment of this invention applied to a portable telephone for a communication system that uses the spread spectrum transmission method, for example, to a cellular portable telephone of the CDMA (Code Division Multiple Access) method, will be described with reference to the attached drawings.

The CDMA method is a communication method in which a plurality of so-called spread spectrum communication signals, each of which is spread using a code different from others, are transmitted in the same time period or in the same frequency band and identified individually by the particularity of the code. This method is excellent in security and privacy of communication signals, as well as in elimination of jamming and interference waves. In this embodiment, the PN code is used for spread-modulation.

Figure 2:
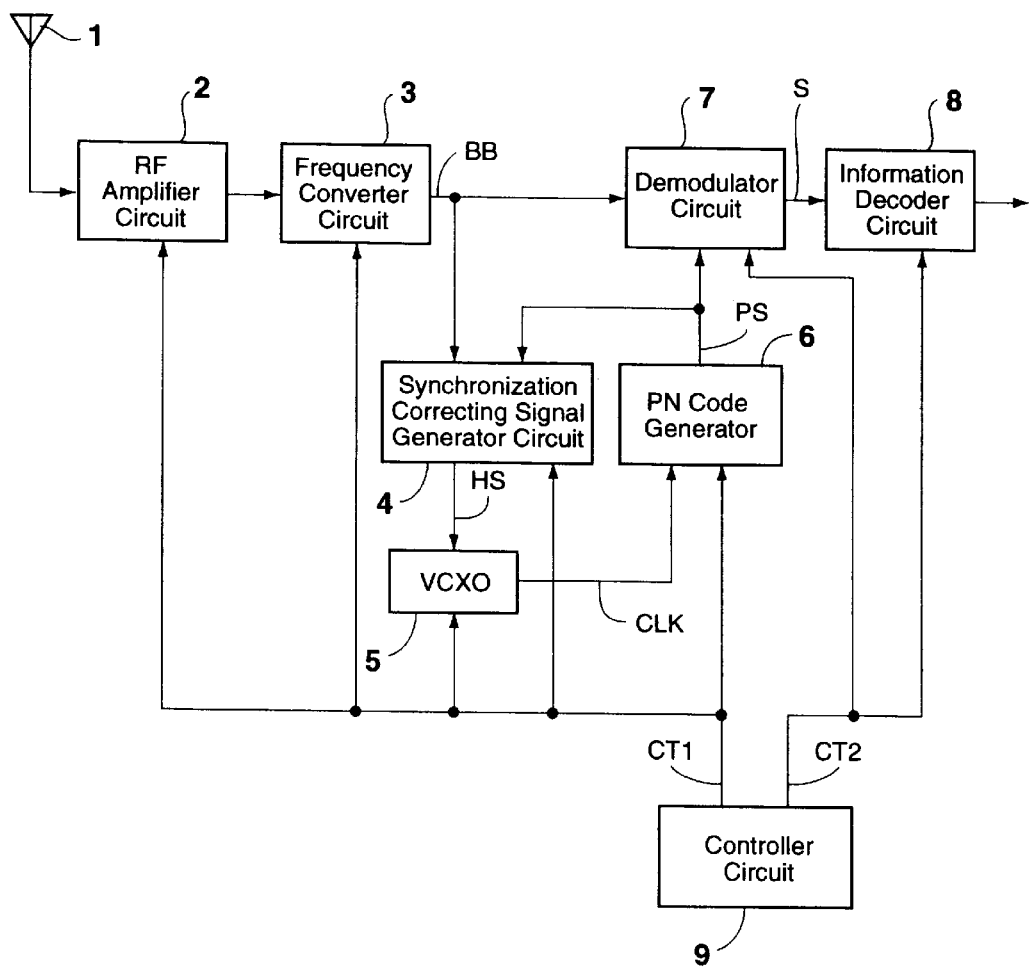
FIG. 2 is a block diagram explaining a receiving apparatus in an embodiment of this invention.

FIG. 2 is a block diagram explaining a receiving unit used for a portable telephone in this embodiment. As shown in FIG. 2, the receiving unit is provided with an antenna 1; an RF amplifier circuit 2; a frequency converter circuit 3; a synchronization correction signal generator circuit 4; a voltage controlled crystal oscillator (hereinafter referred to as VCXO) 5; a PN code generator 6; a demodulator circuit 7 used for demodulating spread-modulated signals; an information decoder circuit 8; and a controller circuit 9.

The antenna 1 receives signals transmitted from the base station and supplies the signals to the RF amplifier circuit 2. The RF amplifier circuit 2 amplifies the level of the supplied signals to the required level and then supplies the signals to the frequency converter circuit 3.

The frequency converter circuit 3 performs automatic tuning to get a base band signal BB from the received signals. The base band signal BB is supplied to both the synchronization correction signal generator circuit 4 and the demodulator circuit 7.

The portable telephone in this embodiment is also provided with a PN code generator 6 used for demodulating spread-modulated and transmitted signals. The PN code generator 6 generates the PN code according to the clock signal CLK from the VCXO 5 and supplies the generated PN code to both the synchronization correcting signal generator circuit 4 and the demodulator circuit 7.

The synchronization correcting signal generator circuit 4 detects a deviation between the generation timing of the PN code used for spread-modulation of signals transmitted from the base station and the generation timing of the PN code generated in the PN code generator 6 of this portable telephone using the base band signal BB from the frequency converter circuit 3 and the PN code (PN code signal) PS supplied continuously from the PN code generator 6.

The synchronization correcting signal generator circuit 4 generates a signal HS for correcting the oscillation frequency of the VCXO 5 according to the detected deviation between the above PN code generation timings and supplies the signal HS to the VCXO 5.

The oscillation frequency of the VCXO 5 is corrected according to the signal HS to adjust the synchronization between the PN code signal PS generated continuously from the PN code generator 6 and the PN code used for spread-modulation.

After the synchronization between the above PN code generation timings is adjusted, the demodulator circuit 7 reproduces the original signal S from spread-modulated signals. This demodulated signal S is supplied to the information decoder circuit 8.

The information decoder 8 decodes the transmitted information by carrying out processings of the demodulated signal S including an error correction so that the information that can be used for the portable telephone in this embodiment is obtained.

The controller circuit 9 supplies and controls the source voltage to each circuit of the portable telephone in this embodiment. In this embodiment, the configuration of controller circuit 9 is formed so that the source voltage to the RF amplifier circuit 2, the frequency converter circuit 3, the synchronization correction signal generator circuit 4 and the PN code generator 6, and the source voltage to the information decoder circuit 8, etc. provided beyond the demodulator circuit 7 can be supplied and controlled separately with the respective control signals CT1 and CT2.

As to be described later, the controller circuit 9 controls specified circuits to be driven according to the kind of processing by controlling the processing to supply the source voltage only to the specified circuit during an intermittent receiving processing to be executed while the portable telephone in this embodiment is waiting for a call.

Figure 3:
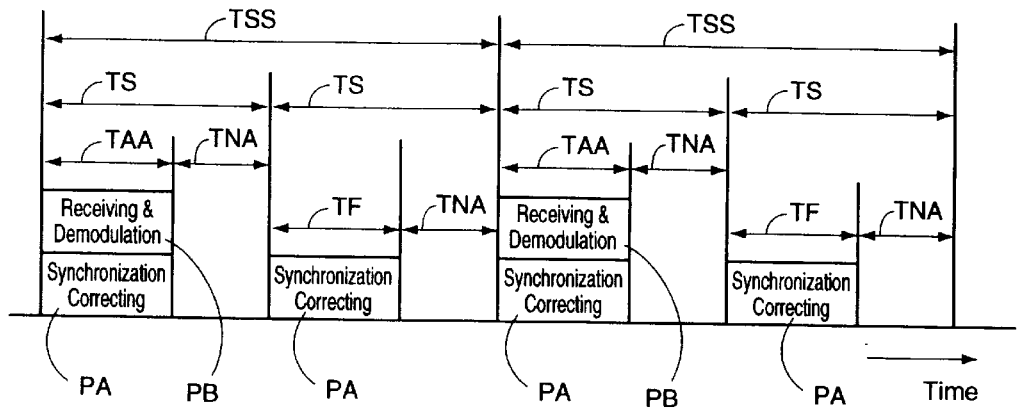
FIG. 3 is a diagram explaining an intermittent receiving processing in a portable telephone for which the receiving apparatus of this invention is used.

FIG. 3 is a diagram explaining an intermittent receiving processing to be executed while the portable telephone in this embodiment is in the waiting status. In FIG. 3, the horizontal axis represents the time and each rectangular frame on the horizontal axis represents a processing to be executed.

In FIG. 3, the processing PA in each rectangular frame indicates a series of processings between receiving of a signal transmitted from the base station and synchronization correction of the above described PN code generation timings. The processing PA is controlled so that the source voltage is supplied to the RF amplifier circuit 2, the frequency converter circuit 3, the synchronization correction signal generator circuit 4, the VCXO 5 and the PN code generator 6 according to the control signal CT1 from the controller circuit 9. In a period TF (hereinafter referred to as a temporary receiving period) in which only this processing PA is executed, no source voltage is supplied to the demodulator circuit 7, the information decoder circuit 8, and other circuits provided beyond them. Thus, the power consumption can be reduced.

Figure 1:
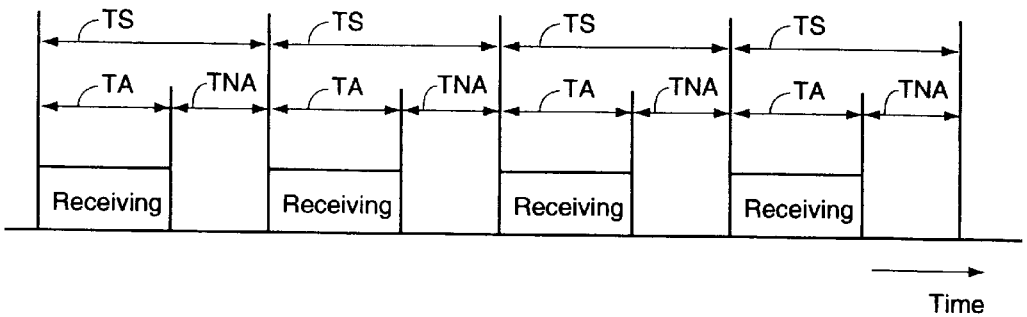
FIG. 1 is a diagram explaining the ordinary intermittent receiving processing of a communication system that uses the spread spectrum transmission method.

The processing PB indicates a series of processings to be executed after demodulation and decoding for obtaining transmitted information by also performing error correction processing for demodulated signals. The processing PB is controlled so that the source voltage can be supplied to the demodulator circuit 7 and the information decoder circuit 8 according to the control signal CT2 from the controller circuit 9. Thus, during a period TAA (hereinafter referred to as a real receiving period) in which both of the processings PA and PB are executed, the source voltage is supplied to all the circuits shown in FIG. 2 according to the control signals CT1 and CT2 from the controller circuit 9 to demodulate and decode received signals. The processings in this receiving period TAA are equivalent to the processings in a period TA shown in FIG. 1 for the ordinary portable telephone.

The processing for decoding the signal transmitted from the base station is expected only to be executed when the calling to the telephone is detected properly. Unlike the synchronization correcting processing to keep the synchronization accuracy, there is no need to execute the decoding processing frequently.

In the portable telephone in this embodiment, therefore, as shown in FIG. 3, the processing PA is executed with the same cycle TS as the ordinary one while the portable telephone is in the waiting status, but the processing PB is executed once synchronously with the processing PA while the processing PA is executed twice. In each period TNA, no source voltage is supplied to any circuit shown in FIG. 1 just like in the ordinary portable telephone. Thus, no receiving processing is executed in the period.

In the portable telephone in this embodiment, the synchronization correcting processing is executed such way in each cycle TS just like in the ordinary portable telephone both in the real receiving period TAA and in the temporary receiving period TF. Consequently, the synchronization accuracy of the portable telephone in this embodiment is never deteriorated.

The demodulation and decoding processings in this embodiment are executed only in the real receiving period TAA. In other words, although such a processing as the synchronization correcting one is executed twice, decoding processing is executed only once. In the portable telephone in this embodiment, therefore, the processing period TAA, which is equivalent to the intermittent receiving processing period TA of the ordinary portable telephone, has a cycle TSS whose length is double the intermittent receiving processing cycle TS of the ordinary portable telephone (shown in FIG. 1). As a result, the number of demodulating and decoding processings is reduced to a half in the ordinary portable telephone, and the power consumption can be much saved according to the reduction of those decoding processings.

Figure 4:
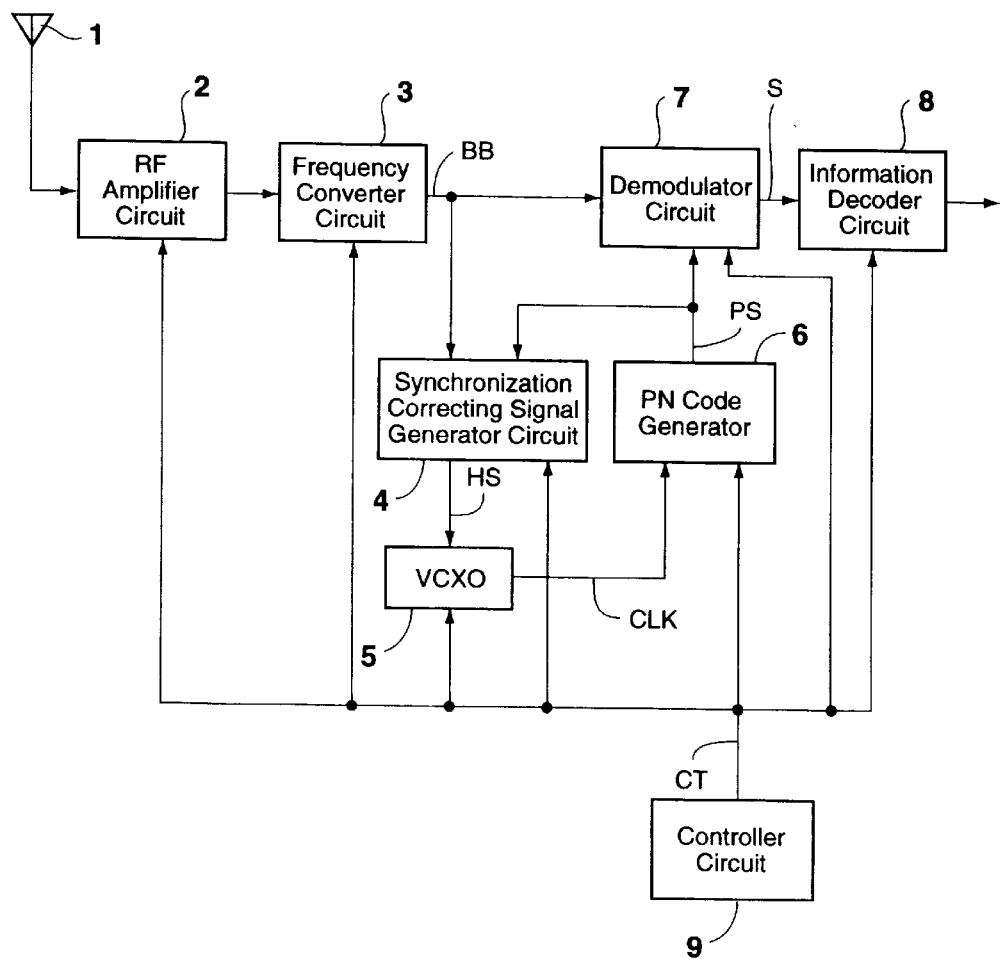
FIG. 4 is a block diagram of an example of the ordinary receiving apparatus of a communication system that uses the spread spectrum transmission method.

In other words, the source voltage to each circuit in the ordinary portable telephone is controlled to be supplied at the same time and in the same way as shown in FIG. 4 according to the control signal CT from the controller circuit 9. Thus, a series of processings (receiving→synchronization correction→demodulation→decoding) are all executed in receiving periods repeated with non-receiving periods as long as those which do not deteriorate the synchronization accuracy.

On the contrary, in the portable telephone in this embodiment, a series of receiving processings are executed intermittently in the order of real receiving period→non-receiving period→temporary receiving period→non-receiving period as shown in FIG. 3. In other words, the synchronization correcting processing is executed at the same timing as that in the ordinary portable telephone, but demodulating and decoding processings are executed only in each real receiving period. The portable telephone in this embodiment can thus reduce power consumption significantly in the waiting status without deteriorating the synchronization accuracy even when a low-price variable frequency oscillator is used.

Furthermore, the reduced power consumption in the waiting status assures a longer waiting time for the telephone, so calls can be detected surely for a longer time.

As described above, the CDMA method uses spread spectrum signals processed by PN codes, but the PN codes are generated with high frequency for demodulating signals for a portable telephone. Thus, generally the power consumption tends to increase in the ordinary portable telephone. On the contrary, a power consumption saving is realized in this embodiment that is especially effective for portable telephones that use the CDMA method.

In the above embodiment, decoding of signals is executed only once while such a processing as synchronization correcting processing is executed twice. However, the decoding may also be executed once while such a processing as synchronization correcting processing is executed n times (2 times or more) within an extent that incoming calls can be detected properly.

What is claimed is:

1. A receiving apparatus intermittently receiving a transmitted modulated signal and demodulating a received signal, comprising:

a synchronization correcting circuit for correcting a frequency of a reference signal by using said received signal for synchronizing said reference signal with said received signal and generating a demodulation signal according to said reference signal;

a demodulating circuit for demodulating said received signal by using said demodulation signal and producing a demodulated signal;

a decoding circuit for decoding said demodulated signal; and a controlling circuit for controlling said synchronization correcting circuit by supplying said synchronization correcting circuit with a first control signal and for independently controlling said demodulating circuit and said decoding circuit by supplying said demodulating circuit and said decoding circuit with a second control signal so that said synchronization correcting circuit is driven at a driving timing different from a driving timing for driving said demodulating circuit and said decoding circuit when said received signal is intermittently received and said controlling circuit powers down said demodulating circuit and said decoding circuit by inhibiting the supply of said second control signal thereto, wherein said controlling circuit controls said demodulating circuit and said decoding circuit to be driven synchronously with said driving timing for said synchronization correcting circuit at a cycle N times, where N is an integer of at least 2, that of said driving timing for driving said demodulating circuit and said decoding circuit.

2. The receiving apparatus as defined in claim 1, wherein said transmitted modulated signal is spread-modulated according to spread spectrum modulation and said demodulating circuit demodulates said spread-modulated signal.

3. The receiving apparatus as defined in claim 1, wherein said receiving apparatus forms a portable communication terminal.

4. The receiving apparatus as defined in claim 2, wherein said receiving apparatus forms a portable communication terminal.

5. A receiving method for intermittently receiving transmitted modulated information and demodulating the received information, comprising the steps of:

performing a first process for correcting a frequency of a reference signal by using the received information for synchronizing said reference signal with said received information and generating a demodulation signal according to said reference signal;

performing a second process for demodulating said received information to be supplied as demodulated information by using said demodulation signal;

performing a third process for decoding said demodulated information; and controlling said first process utilizing a first control signal and independently controlling said second process including processes subsequent thereto utilizing a second control signal, wherein said second process including processes subsequent thereto are not performed when said second control signal is inhibited thereto, and said second process and processes subsequent thereto are intermittently executed synchronously with an execution timing of said first process at an execution cycle N times, where N is an integer of at least 2, that of said first process so that said second process and processes subsequent thereto are executed at a timing independent of said execution timing for intermittently executing said first process.

6. The receiving method as defined in claim 5, wherein said transmitted modulated information is spread-modulated according to spread spectrum modulation and a spread-modulated signal is demodulated in said second process.

7. A communication system comprising:

a base station for modulating control information and transmitting said modulated control information; and a receiving apparatus for intermittently receiving said modulated control information and demodulating the received control information, wherein said received apparatus includes:

first means for correcting a frequency of a reference signal by using said received control information for synchronizing said reference signal with said received control information and generating a demodulation signal according to said reference signal;

second means for demodulating said received control information using said demodulating signal and producing demodulated control information;

third means for decoding said demodulated control information; and fourth means for controlling said first means by supplying said first means with a first control signal and for independently controlling said second means and said third means by supplying said second means and said third means with a second control signal, wherein said fourth means powers down said second means and said third means by inhibiting the suppling of said second control signal thereto, and said second and third means in said receiving apparatus are intermittently operated synchronously with an operation timing of said first means at an operation cycle N times, where N is an integer of at least 2, that of said first means so that said second and third means are operated at a timing independent of said operated timing for intermittently operating said first means.

8. The communication system as defined in claim 7, wherein said modulated and transmitted signal is spread-modulated according to spread spectrum modulation and said second means includes means for demodulating a spread-modulated signal.

9. The communication system as defined in claim 7, wherein said receiving apparatus forms a portable communication terminal.

* * * * *